United States Patent [19]
Townsend

[11] 3,722,857
[45] Mar. 27, 1973

[54] GATE VALVE
[76] Inventor: Charles L. Townsend, 2 Corwin Road, Penfield, N.Y. 14610
[22] Filed: Apr. 19, 1971
[21] Appl. No.: 135,366

Related U.S. Application Data

[63] Continuation of Ser. No. 828,396, May 27, 1969, abandoned.

[52] U.S. Cl. ................251/203, 251/172, 251/328
[51] Int. Cl. ..............................................F16k 25/00
[58] Field of Search .......277/205, 206; 251/172, 203

[56] References Cited

UNITED STATES PATENTS

| | | | |
|---|---|---|---|
| 3,207,524 | 9/1965 | Trbovich | 277/206 |
| 3,258,244 | 6/1966 | Hilton | 251/203 |
| 3,333,814 | 8/1967 | Sargent | 251/172 X |
| 3,378,269 | 4/1968 | Castor | 277/205 |
| 3,384,382 | 5/1968 | Rink | 277/205 X |
| 3,458,220 | 7/1969 | Rose | 277/206 X |

*Primary Examiner*—Harold W. Weakley
*Attorney*—Cumpston, Shaw & Stephens

[57] ABSTRACT

A sliding gate valve has an improved seal and a cammed gate that cooperate to provide better sealing, along with easier operation and a gate of lighter construction. The improved seal is a flexible annular lip around the valve passageway having a ridge engaged by the gate and surfaces on opposite sides of the ridge inclined upward away from the gate for easy camming of the gate into engagement with either side of the ridge. The cammed gate includes cam followers on the gate and cams in the valve housing for forcing the gate against the seal as the gate nears its closed position.

3 Claims, 10 Drawing Figures

INVENTOR.
CHARLES L. TOWNSEND
BY Cumpston, Shaw
and Stephens
HIS ATTORNEY

INVENTOR.
CHARLES L. TOWNSEND

BY

HIS ATTORNEY

INVENTOR.
CHARLES L. TOWNSEND

Patented March 27, 1973　　　　　　　　　　　　　　　3,722,857

INVENTOR.
CHARLES L. TOWNSEND

BY Cumpston Shaw
and Stephens

HIS ATTORNEY 3,722,857

GATE VALVE

This is a continuation of application Ser. No. 828,396, filed May 27, 1969 and now abandoned.

THE INVENTIVE IMPROVEMENT

Sliding gate valves are customarily used in sewage storage systems for boats, travel trailers and the like. Prior art versions of such valves have suffered from poor sealing, short seal life, sticking, binding, and jamming. This invention offers two suggestions for improvements of such valves — an improved seal and a cammed gate. Either of these suggestions are forward steps in themselves, but they also cooperate together in a specially advantageous way to provide a sliding gate valve that seals effectively and reliably, is smooth acting with low operating forces, and has a long seal life. The inventive combination allows a gate of lighter construction, a valve that is easier to operate and that does not stick, jam, or leak. Furthermore, these advantages are achieved without extra expense in manufacture or installation, and without any sacrifice in simplicity, reliability or durability.

SUMMARY OF THE INVENTION

The improved seal for a sliding gate valve includes an annular lip arranged around the valve passageway with the proximal end of the lip secured to the valve housing and the distal end of the lip extending flexibly and generally horizontally inward around the periphery of the valve passageway so that the distal end of the lip is movable axially of the passageway. The gate side of the lip has a ridge confronting the gate between the distal and proximal ends of the lip, and the surfaces of the lip on opposite sides of the ridge are inclined away from the gate at acute angles in the normally assumed position of the lip. The lip is thickest in the region of its ridge, and has substantially equal and uniform thickness on opposite sides of the ridge.

The cammed gate has a plurality of cam followers arranged on the side of the gate opposite the seal, with the housing on that side of the gate having a corresponding plurality of cams outside the valve passageway and arranged so that cams and cam followers move the gate axially of the passageway against the seal as the gate nears its closed position to force the gate against the seal for sealing the passageway closed.

The inclined surfaces of the lip adjacent the ridge facilitate camming of the gate against the ridge as the gate is slid against the seal, and the inclinations on each side of the ridge ensure that such camming is successful at both the near and far sides of the seal as the gate slides across the seal. Camming of the gate against the seal is particularly successful with the inventive seal and allows the gate to be made of lighter construction and to move freely and easily across the seal and yet make an effective and reliable sealing engagement with the seal, without excessive wear.

DRAWINGS

DETAILED DESCRIPTION

Figure 1:
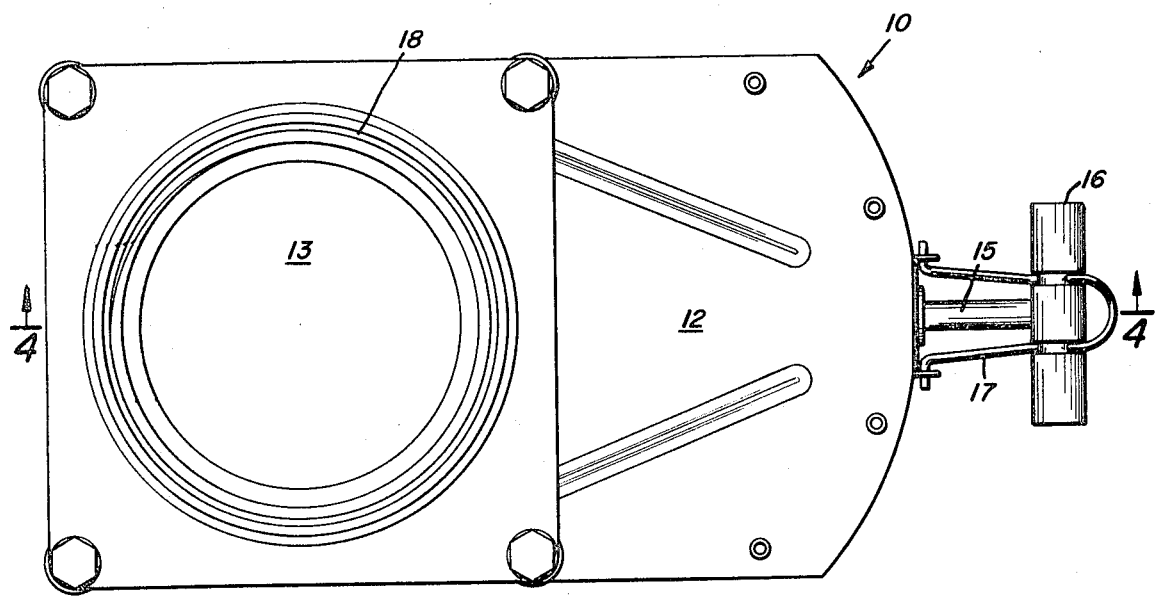
FIG. 1 is a plan view of the preferred embodiment of the inventive sliding gate valve showing the valve in closed position.
Figure 2:
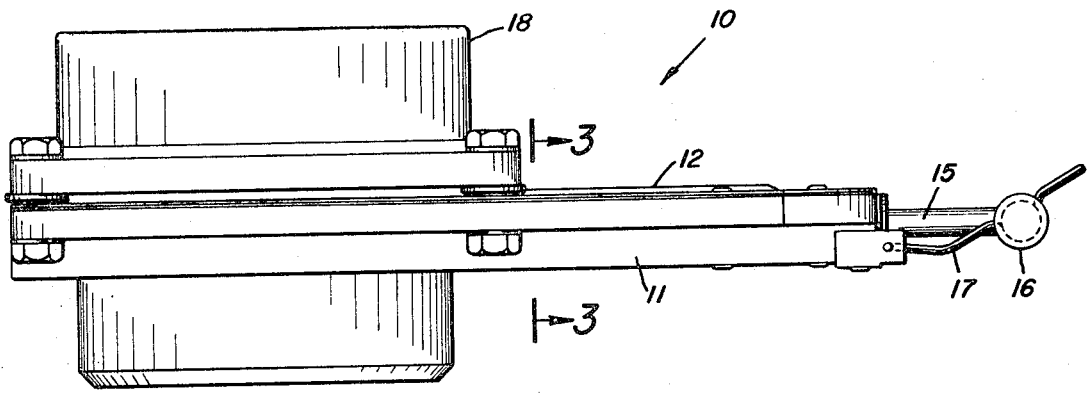
FIG. 2 is a side elevational view of the valve of FIG. 1.
Figure 3:
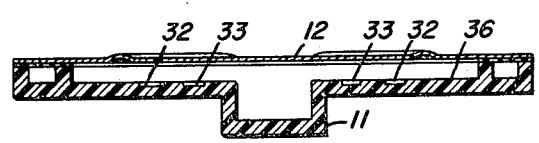
FIG. 3 is a cross section of the valve of FIG. 2 taken along the line 3—3 thereof.
Figure 4:
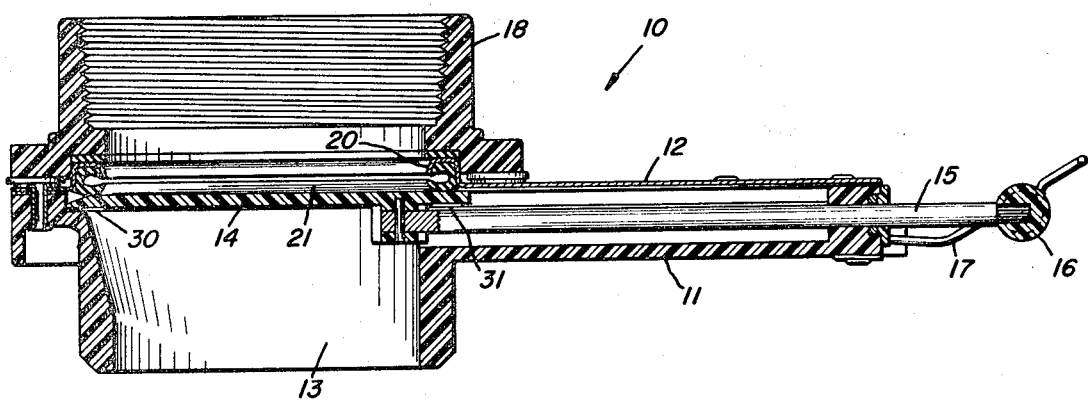
FIG. 4 is a cross section view of the valve of FIG. 1 taken along the line 4—4 thereof.
Figure 5:
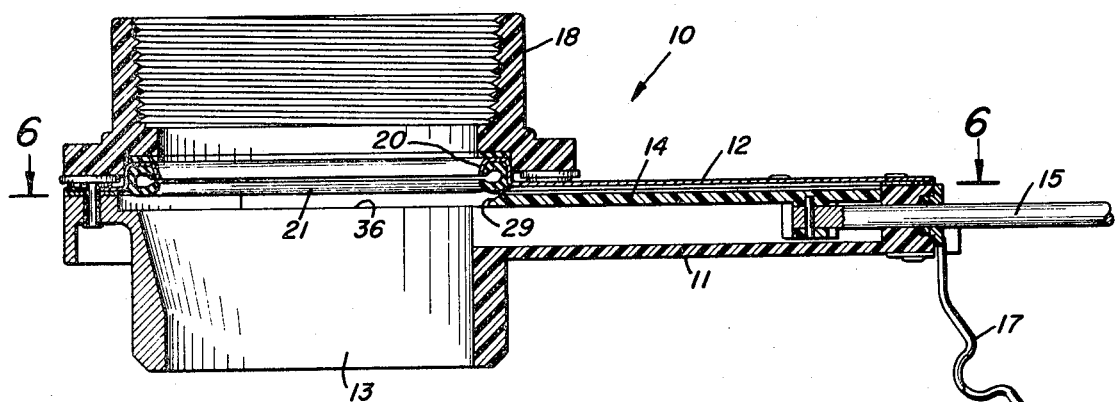
FIG. 5 is a cross section view corresponding to FIG. 4 but showing the valve in open position.
Figure 6:
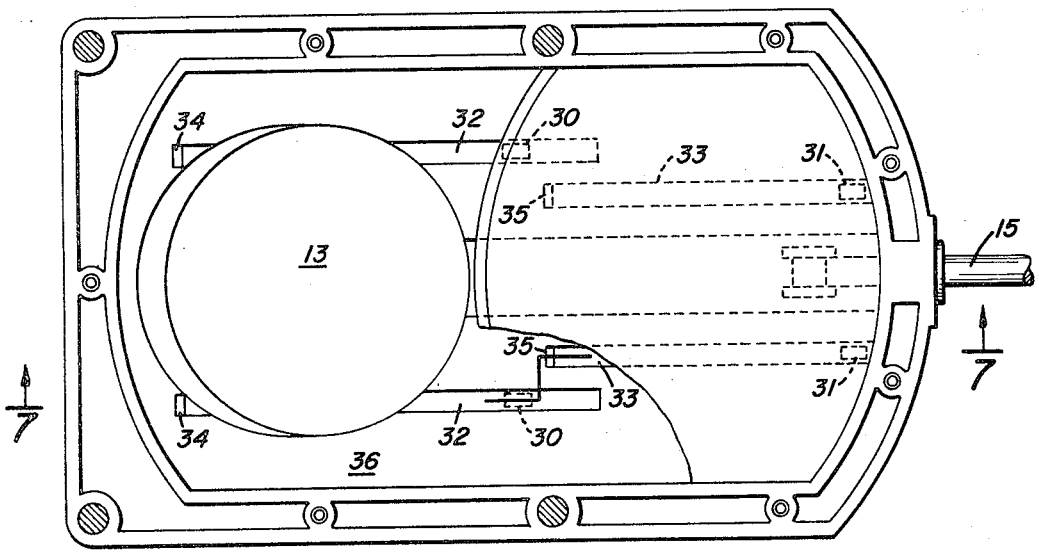
FIG. 6 is a cross section view of the valve of FIG. 5 taken along the line 6—6 thereof.
Figure 7:
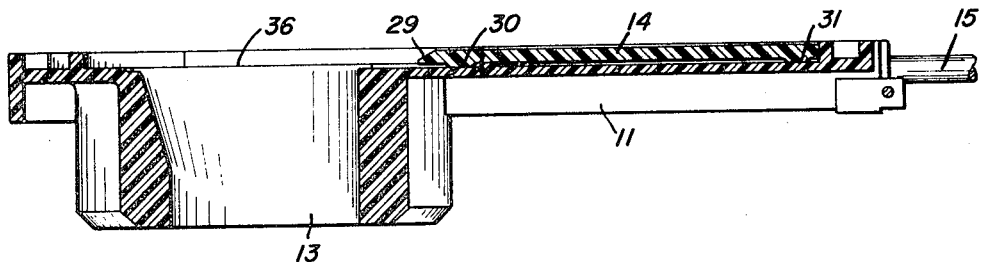
FIG. 7 is a cross section view of the valve of FIG. 6 taken along the line 7—7 thereof.
Figure 8:
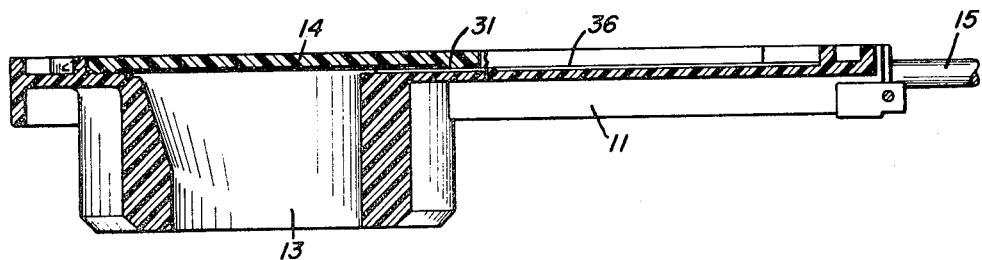
FIG. 8 is a cross section view corresponding to FIG. 7 but showing the valve in closed position.
Figure 9:
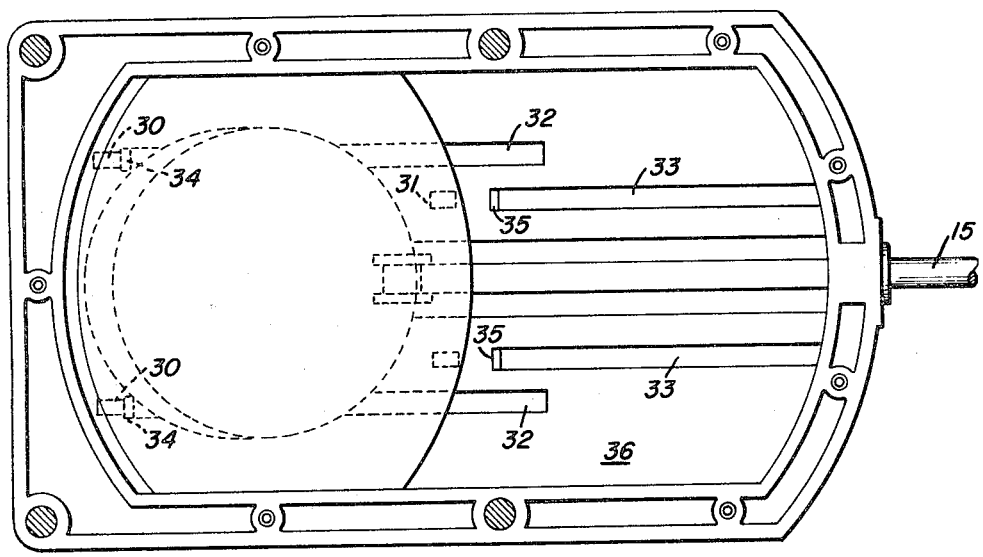
FIG. 9 is a cross section view corresponding to the view of FIG. 6 but showing the valve in closed position.

For convenience, all the views of the drawing show various aspects of a single preferred embodiment of the inventive valve. Corresponding parts have the same reference numbers throughout the drawings. It should be understood in following this description, that other embodiments and variations are possible within the spirit of the invention.

Valve 10 is designed for use in the sewage storage systems of boats, travel trailers, camp trailers, etc., but it is not limited to these applications. Generally, valve 10 has a housing including a slide body 11 and a cover 12 extending around a valve passageway 13 through the housing. A gate 14 slides transversely of passageway 13 in slide body 11 under cover 12 to open or close passageway 13. Gate 14 is moved by rod 15 having a handle 16, and a spring latch 17 is arranged for clamping handle 16 in place to hold gate 14 in a closed position. A pipe connection 18 is shown bolted to the housing of valve 10 to afford an entrance to passageway 13. Valve 10 is installed in place as desired in any generally known way to be opened and closed by gate 14.

SEAL

Cover 12 has annular channel 20 around the periphery of passageway 13 above gate 14. A seal generally denoted as 21 is disposed in channel 20 for a sealing engagement with gate 14. A base portion 22 of seal 21 is preferably molded in place inside channel 20 to secure seal 21 in position around passageway 13.

Figure 10:
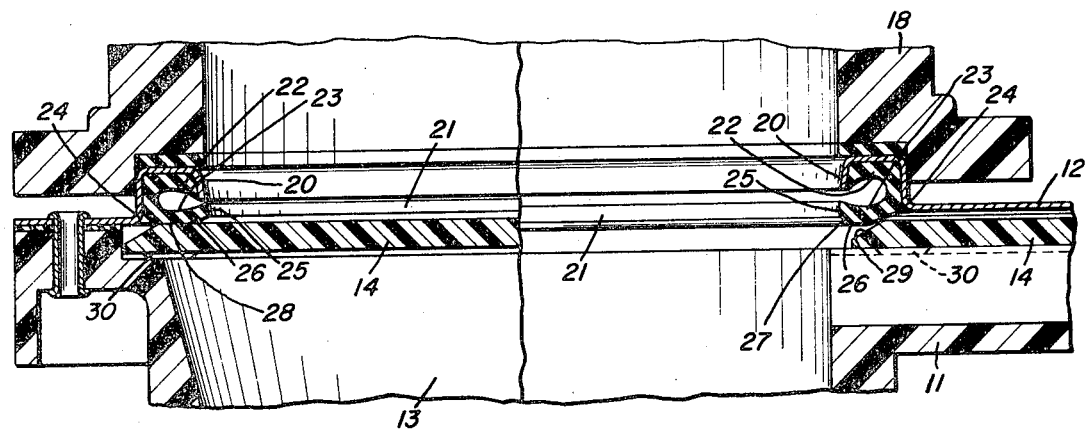
FIG. 10 is an enlarged fragment of a cross sectional view corresponding to the views of FIGS. 4 and 5, and showing the valve in both open and closed position.

The sealing portion of seal 21 is a flexible lip 23 having its proximal end 24 joined to base 22, to anchor it to channel 20 in the housing of valve 10. Lip 23 extends generally horizontally inward around the periphery of passageway 13 in its normally assumed position as best shown in FIG. 10. The distal end 25 of lip 23 is thus resiliently disposed to move axially of passageway 13.

The under side of lip 23 has a ridge 26 confronting gate 14 and extending downward between proximal end 24 and distal end 25. Under surfaces 27 and 28 of lip 23 adjacent ridge 26 incline upwardly away from gate 14 at acute angles to gate 14. Lip 23 is thickest in the region of ridge 26, and has a substantially uniform and even thickness on opposite sides of ridge 26.

Gate 14 has a bevel 29 at its upper forward edge to interact with surfaces 27 and 28 of the under side of lip 23. As gate 14 slides under seal 21, bevel 29 first engages incline surface 28 of seal 21 to cam lip 23 upward smoothly as gate 14 advances. After gate 14 has passed half-way under seal 21, bevel 29 begins to engage surface 27 around the inner bottom of lip 23 for camming the remainder of lip 23 upward as gate 14 proceeds toward its closed position. This ensures a smooth camming of lip 23 upward on both sides of ridge 26 as gate 14 slides across each half of seal 21. The result is a smooth action requiring relatively little force and resulting in a good resilient seal between lip 23 and gate 14.

CAMMED GATE

Gate 14 is preferably cammed into its closed position in engagement with seal 21. For this purpose a pair of forward cam followers 30 and a pair of after cam followers 31 extend downward from the under surface of gate 14 to form slide projections. Cam followers 30 ride in grooves 32, and cam followers 31 ride in grooves 33 formed in slide body 11 of the housing of valve 10. Grooves 32 and 33 have respective cam ramps 34 and 35 at one end leading to the ungrooved plane surface 36 of slide body 11, and cams 30 and 31 ride respectively up ramps 34 and 35 to surface 36 as gate 14 nears its closed position. This moves gate 14 axially of passageway 13 and against seal 21.

The camming of gate 14 against seal 21 as it nears a closed position ensures better compression of seal 21 and a more secure sealing engagement with seal 21. It also allows gate 14 to be made of fairly light construction, and strengthening ridges previously found necessary on the under side of gate 14 can be eliminated. Gate 14 moves relatively freely and easily under seal 21 without having to compress seal 21 fully until it nears its closed position, and this contributes to smooth action without requiring undue force. It also reduces the wear on seal 21 and contributes to long and reliable sealing.

COMBINATION OPERATION

The improved seal and the cammed gate cooperate in the inventive valve to provide an especially advantageous sealing arrangement. Seal 21 with its axially movable lip 23 is especially designed for cooperating with a cammed gate that also has a scope of axial movement. Cam surfaces 27 and 28 on the bottom of seal lip 23 cooperate with the advancing gate for a slight camming of seal 21 axially of passageway 13, and when gate 14 is cammed toward seal 21 to the closed position best shown in FIG. 10 the whole under surface 28 of lip 23 adjacent ridge 26 is brought into the plane of the top of gate 14 for a broad and secure sealing engagement with gate 14. Without the axial camming of gate 14, surface 28 could not be readily made to flex sufficiently to bring surface 28 flat against the upper surface of gate 14. If lip 23 were flexed its full extend by the closure of an uncammed gate, the friction forces would be substantial, and gate 14 would move stiffly and require considerable force. Also, gate 14 would have to be made of stronger construction to accomplish such flexure, and the seal would suffere excessive wear. Hence, in cooperation, cammed gate 14 and seal 21, with its widely flexible lip 23 having inclined undersurfaces 27 and 28, accomplish improved sealing in sliding gate valves of this type.

Persons wishing to practice the invention should remember that other embodiments and variations can be adapted to particular circumstances. Even though one point of view is necessarily chosen in describing and claiming the invention, this should not inhibit broader or related applications within the spirit of the invention. For example, different camming arrangement can be used to cam the gate towards its closed position, housing and passageway parts can have a variety of shapes and sizes, and the inventive seal can be anchored in place in a variety of ways to function within the spirit of the invention.

I claim:

1. In a sliding gate valve having a housing around a vertical passageway, a horizontally sliding gate for opening and closing said passageway, and a seal engaged by said gate for sealing said passageway closed, an improved sealing arrangement comprising:
  a. said seal having an annular, flexible lip, arranged around said passageway;
  b. a proximal end of said lip secured to said housing;
  c. said lip being self-supporting to extend flexibly and generally horizontally and radially inward around the perimeter of said passageway so that the distal end of said lip is movable vertically axially of said passageway;
  d. the under side of said lip having a ridge confronting said gate and forming the lowermost surface of said lip;
  e. said ridge being formed between said distal and said proximal ends of said lip;
  f. each of the surfaces of said under side of said lip on opposite sides of said ridge being inclined downward toward said gate at acute angles to the horizontal in the normally assumed position of said lip, said under surfaces meeting at said ridge and forming inclines tending to move up over the leading edge of said gate as said gate slides closed under said annular lip to lift said ridge during any portion of the closing motion of said gate;
  g. said lip being thickest in the region of said ridge and having substantially equal and uniform thickness on opposite sides of said ridge;
  h. said housing being configured to provide a plurality of cams outside said passageway;
  i. said gate being configured to provide a plurality of cam followers;
  j. said cams and said cam followers being disposed for raising said gate axially of said passageway against said ridge to lift said lip as said gate nears its closed position and press said ridge and said gate tightly together to form a seal around said passageway; and
  k. said housing includes a slide body configured to provide grooves extending in the direction of sliding motion of said gate, with said cams comprising ramps in the region of the ends of said grooves.

2. The gate valve sealing arrangement of claim 1 wherein said followers comprise glide projections arranged for sliding in said grooves, and said housing includes a cover arranged over the seal side of said gate and extending around said passageway.

3. The gate valve sealing arrangement of claim 2 wherein said cover is formed with an annular channel around said passageway and said proximal end of said lip is formed as a body molded into said channel.

* * * * *